(12) United States Patent
Higuchi

(10) Patent No.: US 12,214,503 B2
(45) Date of Patent: Feb. 4, 2025

(54) ROBOT CONTROL SYSTEM, INFORMATION PROCESSOR, INFORMATION PROCESSING METHOD, AND NON-TRANSITORY COMPUTER READABLE MEDIUM STORING PROGRAM

(71) Applicant: OMRON Corporation, Kyoto (JP)

(72) Inventor: Toshiyuki Higuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 290 days.

(21) Appl. No.: 17/730,498

(22) Filed: Apr. 27, 2022

(65) Prior Publication Data

US 2022/0379471 A1    Dec. 1, 2022

(30) Foreign Application Priority Data

May 27, 2021  (JP) ................................. 2021-089386

(51) Int. Cl.
 *B25J 9/16* (2006.01)
 *B25J 13/06* (2006.01)

(52) U.S. Cl.
 CPC ............. *B25J 9/1664* (2013.01); *B25J 13/06* (2013.01)

(58) Field of Classification Search
 CPC ........ B25J 9/1664; B25J 13/06; B25J 9/1676; B25J 9/1602; B25J 9/16; G05B 2219/39082
 See application file for complete search history.

(56) References Cited

U.S. PATENT DOCUMENTS

| 9,278,451 B2 * | 3/2016 | Kouno ............... G05B 19/4061 |
| 10,335,964 B2 | 7/2019 | Ogawa |
| 2017/0261962 A1 * | 9/2017 | Naitou ................... B25J 9/1676 |
| 2017/0355079 A1 | 12/2017 | Takahashi |
| 2018/0259925 A1 | 9/2018 | Fujimura et al. |
| 2019/0030716 A1 * | 1/2019 | Chevallereau ......... B25J 9/1674 |
| 2019/0105788 A1 * | 4/2019 | Pilz ..................... G05B 19/4061 |
| 2021/0283773 A1 * | 9/2021 | Ahn ...................... A47L 9/2857 |
| 2022/0203538 A1 | 6/2022 | Ning |

FOREIGN PATENT DOCUMENTS

| JP | 2000263489 A | 9/2000 |
| JP | 2017221985 A | 12/2017 |
| JP | 2018151866 A | 9/2018 |
| JP | 2019069509 A | 5/2019 |
| WO | 2020240977 A1 | 12/2020 |

OTHER PUBLICATIONS

Extended European Search Report issued in European Appln. No. 22171075.9 mailed Oct. 20, 2022.
Office Action issued in Japanese Appln. No. 2021-089386, mailed Oct. 22, 2024. English machine translation provided.
Office Action issued in Chinese Appln. No. 202210443141.5, mailed Oct. 15, 2024. English machine translation provided.

* cited by examiner

*Primary Examiner* — Adam R Mott
*Assistant Examiner* — Sagar K C
(74) *Attorney, Agent, or Firm* — ROSSI, KIMMS & McDOWELL LLP

(57) ABSTRACT

A technique allows verification of a robot operation without any cost for an additional robot or for a person entering a monitoring area. A robot control system includes a monitored robot for which a monitoring area is defined and a robot controller that controls the monitored robot in a plurality of modes including a first mode to change an operation of the monitored robot in response to an object detected in the monitoring area being a robot.

10 Claims, 6 Drawing Sheets

ROBOT CONTROL SYSTEM, INFORMATION PROCESSOR, INFORMATION PROCESSING METHOD, AND NON-TRANSITORY COMPUTER READABLE MEDIUM STORING PROGRAM

CROSS-REFERENCE TO RELATED APPLICATION

This application claims priority to Japanese Patent Application No. 2021-089386 filed on May 27, 2021, the contents of which are incorporated herein by reference.

FIELD

The present invention relates to a technique for verifying the operation of a robot.

BACKGROUND

The factory automation market provides practical techniques for ensuring the operational safety of robots installed in factories. For example, Patent Literature 1 describes a system for evaluating the functional safety of a designed safety program. The system evaluates the safety program by comparing, with an expected value, an output signal responding to an input signal for evaluation. Patent Literature 2 describes a technique for safeguarding cooperative work of technical equipment, robots, and machines. A preregistered autonomous unit allows the technical equipment to continue operating when a person enters a monitoring area around the technical equipment and causes the technical equipment to shift to a safe state when a person or any object other than the autonomous unit enters a potentially hazardous area.

CITATION LIST

Patent Literature

Patent Literature 1: Japanese Unexamined Patent Application Publication No. 2018-151866
Patent Literature 2: Japanese Unexamined Patent Application Publication No. 2019-069509

SUMMARY

Technical Problem

With such known techniques for verifying the robot operation, a person physically enters the monitoring area to determine the robot operation (whether to continue a current operation or shift to a safe state). To automatically verify the robot operation, an additional verification unit may enter the monitoring area. The additional unit takes time and cost for registration.

In response to the above issue, one or more aspects of the present invention are directed to a technique for verifying the robot operation without any cost for verification work by a person entering a monitoring area or for an additional verification unit.

Solution to Problem

In response to this, a system, a device, and a method according to one or more aspects of the present invention have the structures described below.

A robot control system according to a first aspect of the present invention includes a monitored robot for which a monitoring area is defined and a robot controller that controls the monitored robot in a plurality of modes including a first mode to change an operation of the monitored robot in response to an object detected in the monitoring area being a robot. The plurality of modes may include a second mode to cause the monitored robot to operate. The robot controller may control the monitored robot to continue the operation of the monitored robot in the second mode. This structure allows use of the robot in operation for the operation verification of the monitored robot without any cost for an additional verification robot or for a person entering the monitoring area.

The system may further include a determiner that determines whether to change or continue the operation of the monitored robot in accordance with specified information specifying operation verification of the monitored robot. In the first mode, the robot controller may control the monitored robot to change or continue the operation in accordance with a result of determination performed by the determiner. The operation verification of the monitored robot thus includes verification (monitoring verification) for changing the operation of the monitored robot when another robot, other than the monitored robot, that routinely enters the monitoring area in normal operation to represent a person is determined likely to come in contact with the monitored robot in the monitoring area, and verification (normal operation verification) for continuing the operation of the monitored robot when the other robot entering the monitoring area is likely to work as programmed and is determined unlikely to come in contact with the monitored robot.

The monitoring area may include a plurality of subareas, and the robot control system may further include a receiver that receives information specifying at least one subarea of the plurality of subareas to undergo operation verification in the first mode. The robot controller may control the other robot to enter the at least one subarea specified with the information received by the receiver. The system may further include a display that displays information indicating whether the monitoring area is an area that has undergone operation verification of the monitored robot in the first mode. The structure performs operation verification of the monitored robot using the conditions changed for each subarea of the monitoring area or performs such operation verification for an intended area alone, thus allowing more efficient operation verification.

An information processor according to a second aspect of the present invention includes an obtainer that obtains an output signal indicating detection of an object in a monitoring area defined for a monitored robot and a robot controller that controls the monitored robot in a plurality of modes including a first mode to change an operation of the monitored robot in response to the object being a robot based on the output signal obtained by the obtainer. This structure allows use of the robot in operation for the operation verification of the monitored robot without any cost for an additional verification robot or for a person entering the monitoring area.

Other aspects of the present invention may be directed to an information processing method including at least part of the above processes, a program for causing a computer to implement the method, or a non-transitory computer-readable storage medium storing the program. The above structure and processes may be combined with one another unless any technical contradiction arises.

Advantageous Effects

The structure according to the above aspects of the present invention allows operation verification of the robot without any cost for verification work by a person entering a monitoring area or for an additional verification unit.

DETAILED DESCRIPTION

Example Use

An example use of the structure according to one or more embodiments of the present invention will now be described. A known technique is used to verify, in response to an object entering a monitoring area of a robot installed in a factory, whether the robot can operate appropriately (whether to continue a current operation or to shift to a safe state) in accordance with the object. With this technique, for example, a person enters the monitoring area to determine an actual operation of the robot. To automatically verify the robot operation, an additional unit is to enter the monitoring area. The additional unit takes time and cost for registration.

Figure 1:
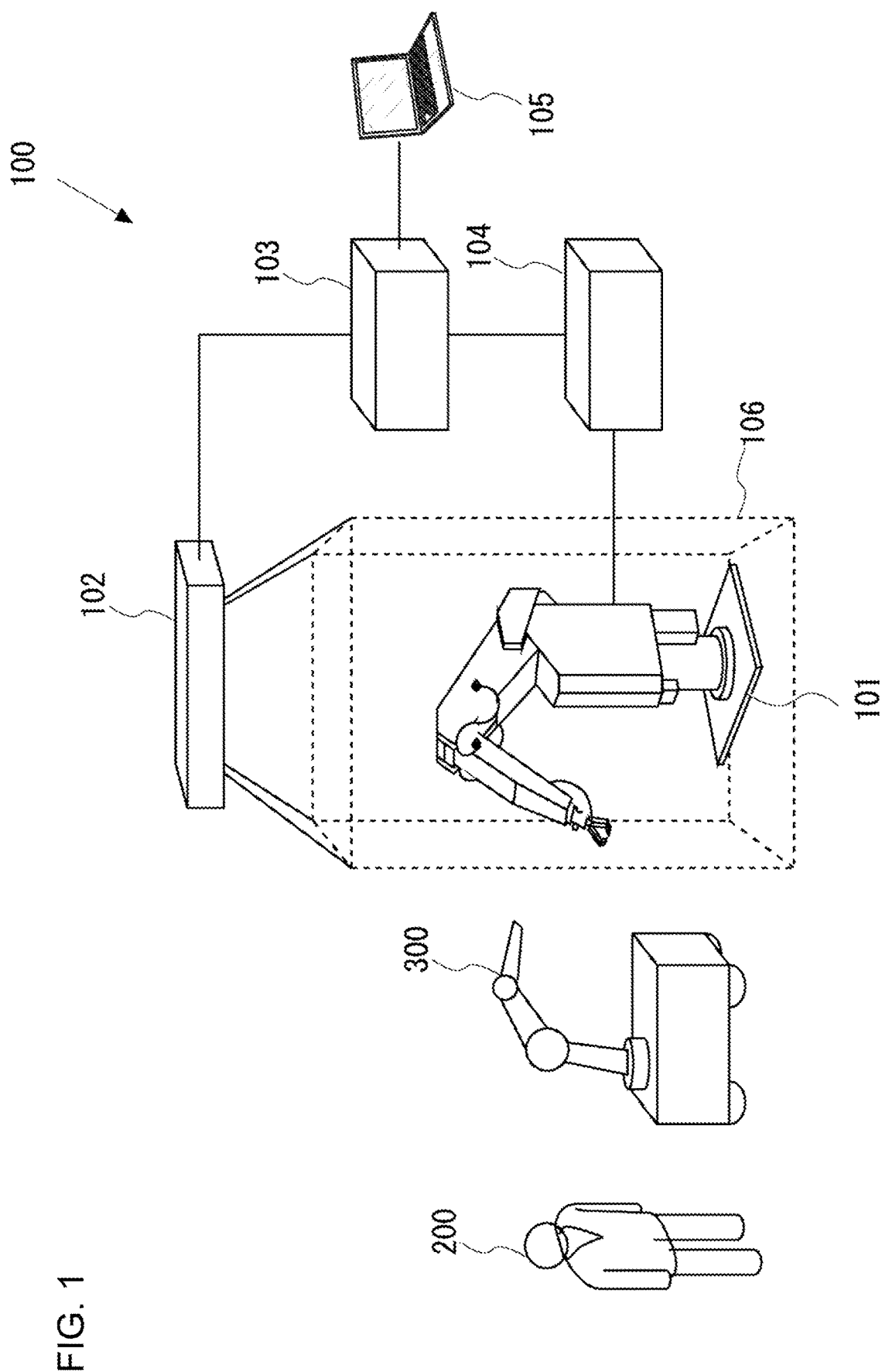
FIG. 1 is a schematic diagram of an example safety system with the structure in one or more embodiments of the present invention.

FIG. 1 is a schematic diagram of an example safety system 100 with the structure according to one or more embodiments of the present invention. The safety system 100 includes a work robot 101, a monitoring sensor 102, a safety controller 103, a robot controller 104, and a personal computer (PC) 105. The safety system 100 corresponds to a robot control system in an aspect of the present invention. The work robot 101 is an industrial robot installed and monitored in a factory, for example. The work robot 101 corresponds to, in an aspect of the present invention, a monitored robot for which a monitoring area is defined. The work robot 101 is not limited to a robot installed at a fixed position, but may also be a movable robot installed on a rack, for example. The monitoring sensor 102 monitors a monitoring area 106 including the movable range of the work robot 101. In the example described below, the monitoring sensor 102 is a three-dimensional sensor, which may be a time of flight (ToF) sensor (ToF camera) with infrared light. The monitoring sensor 102 detects a worker 200 and an autonomous robot 300 entering the monitoring area 106. The autonomous robot 300 is, for example, a mobile robot that can operate autonomously in a factory. The autonomous robot 300 corresponds to a robot to enter the monitoring area in an aspect of the present invention. The robot to enter the monitoring area of the work robot 101 is not limited to the autonomous robot 300, but may be a non-autonomous work robot that is controllable to enter the monitoring area. The safety controller 103 performs the process described below and transmits, to the robot controller 104, an instruction for verifying the operation of the work robot 101 in the safety system 100. The robot controller 104 controls, as instructed by the safety controller 103, the operation of the work robot 101 or controls the operation mode of the work robot 101 when the autonomous robot 300 enters the monitoring area 106. The PC 105 creates a program for verifying the operation of the work robot 101 and displays verification results. The safety controller 103 corresponds to an information processor in an aspect of the present invention.

The safety system 100 according to one or more embodiments of the present invention allows operation verification of the robot without any cost for verification work by a person entering the monitoring area or for preparation or registration of an additional verification unit.

First Embodiment

A first embodiment of the present invention will now be described.

Figure 2:
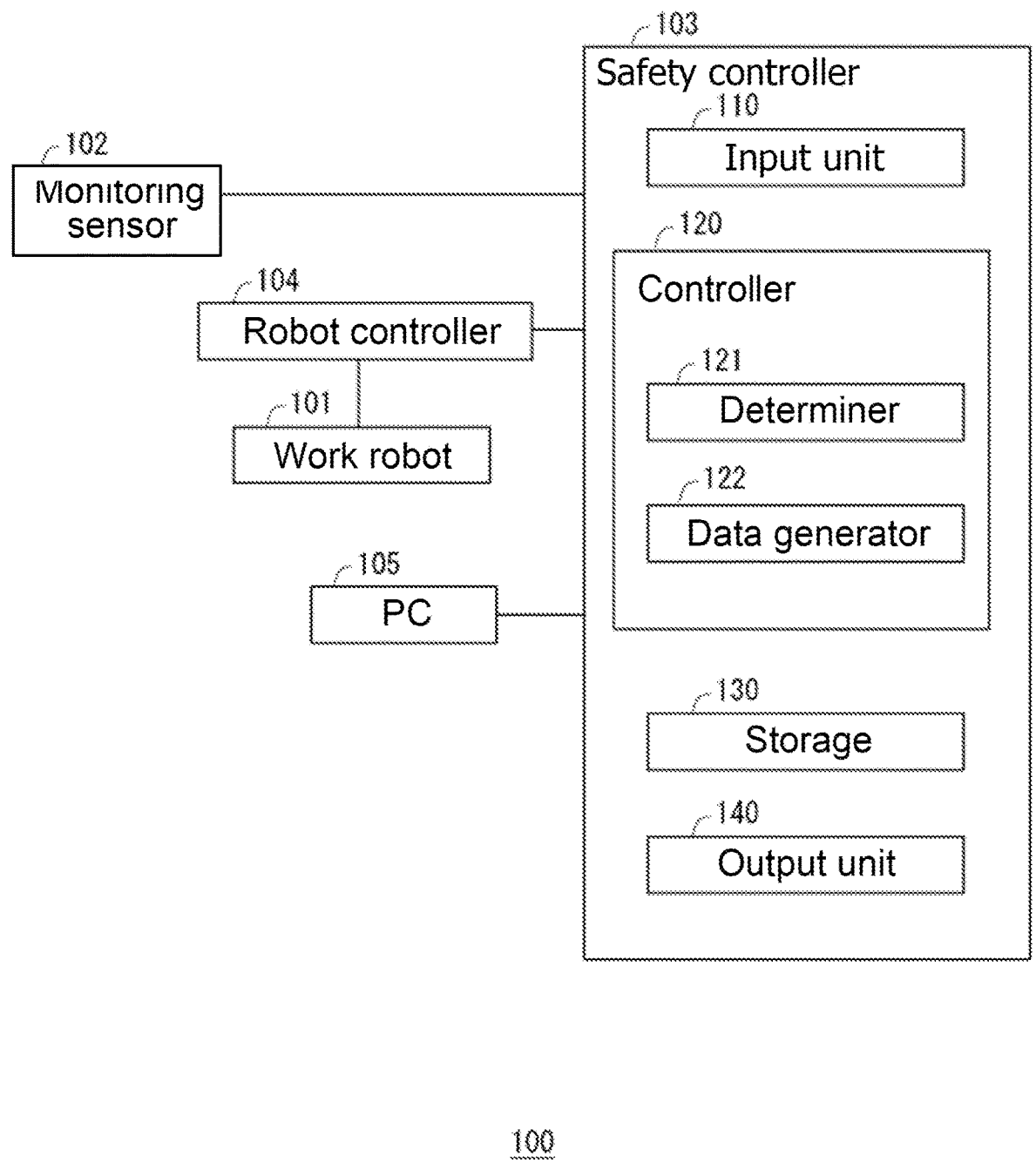
FIG. 2 is a block diagram of a safety system according to an embodiment.

FIG. 2 is a schematic block diagram of the safety system 100 according to the first embodiment. In the first embodiment, the work robot 101 is installed on a cellular assembly line in a factory, for example. The safety system 100 verifies the operation of the work robot 101 when the autonomous robot 300 enters the monitoring area 106 of the monitoring sensor 102.

In the first embodiment, the autonomous robot 300 may be an autonomous mobile robot (AMR) that autonomously travels an automatically calculated route, an automatic guided vehicle (AGV) that travels a prespecified route, or any other industrial robot.

In the first embodiment, the PC 105 may be at any location. For example, the PC 105 may be a cloud computer.

The safety controller 103 includes an input unit 110, a controller 120, a storage 130, and an output unit 140. The controller 120 includes a determiner 121 and a data generator 122. The input unit 110 corresponds to an obtainer, the monitoring sensor 102 to a monitor, and the controller 120 to a robot controller in an aspect of the present invention.

In the present embodiment, in response to any object such as the autonomous robot 300 entering the monitoring area 106, the monitoring sensor 102 outputs a signal indicating the object in the monitoring area 106 to the safety controller 103. The input unit 110 obtains the output signal from the monitoring sensor 102. The output signal from the monitoring sensor 102 obtained by the input unit 110 is stored into the storage 130 by the controller 120. The output signal from the monitoring sensor 102 obtained by the input unit 110 is data indicating the position and the shape of the detected object in the monitoring area 106.

The controller 120 includes, for example, a central processing unit (CPU), a random-access memory (RAM), and a read-only memory (ROM). The controller 120 controls each unit in the safety controller 103 and performs various information processing operations.

Example operation modes of the work robot 101 include an operation verification mode and a normal operation mode. The operation verification mode is a mode for determining whether the operation of the work robot 101 is controlled appropriately in response to the autonomous robot 300 entering the monitoring area 106. More specifically, the operation verification mode is used to determine whether the operation of the work robot 101 is stopped appropriately in response to the autonomous robot 300 that is likely to come in contact with the work robot 101 entering the monitoring area 106. This allows the safety system 100 to verify, in response to an object entering the monitoring area 106, whether the work robot 101 in operation can stop operating to avoid contact with the object. The operation verification mode corresponds to a first mode in an aspect of the present invention. In the operation verification mode, the work robot 101 may be controlled to change the operation to any state such as deceleration to avoid contact with the object, instead of being controlled to stop operating.

The normal operation mode is a mode for the work robot 101 to perform its ordinary tasks, such as any work or transportation. In the normal operation mode, the work robot 101 continues operating when the autonomous robot 300 enters the monitoring area 106. The autonomous robot 300 travels a predetermined route to avoid contact with the work robot 101. Thus, in the normal operation mode, the autonomous robot 300 entering the monitoring area 106 does not come in contact with the work robot 101 in operation. The work robot 101 thus continues operating. However, the autonomous robot 300 and the work robot 101 may come in contact with each other in the normal operation mode for any unintended motion (e.g., due to malfunction of a device). In such a case, the autonomous robot 300 may be controlled to decelerate or stop, or to take a route avoiding the work robot 101. Instead of or in addition to such control, the work robot 101 may be controlled to decelerate or stop. The normal operation mode corresponds to a second mode in an aspect of the present invention. The first mode and the second mode correspond to a plurality of modes in an aspect of the present invention.

The determiner 121 determines whether the object in the monitoring area 106 is the autonomous robot 300 based on the signal from the monitoring sensor 102 obtained by the input unit 110. The determiner 121 also determines the operation mode of the work robot 101. In response to the object being the autonomous robot 300 entering the monitoring area 106, the controller 120 performs, based on the determination about the object and the operation mode from the determiner 121, operation verification of the work robot 101 in accordance with the operation mode of the work robot 101. In response to the autonomous robot 300 not being the autonomous robot 300 entering the monitoring area 106, the controller 120 causes the data generator 122 to generate a control signal to stop the operation of the work robot 101 to avoid contact between the work robot 101 and the entering object.

The data generator 122 generates control signals for the operation of the work robot 101 and data indicating the results of the processing performed by each unit in the controller 120. The control signals and the data generated by the data generator 122 are output through the output unit 140 or stored into the storage 130.

In addition to the above data, the storage 130 stores identification information about the work robot 101 and the autonomous robot 300, programs executable by the controller 120, and various items of data used by the controller 120. For example, the storage 130 is an auxiliary storage device such as a hard disk drive or a solid state drive. The output unit 140 outputs control signals for the operation of the work robot 101 generated by the data generator 122. The data generated by the data generator 122 may be stored into the storage 130 for output to an external display, an external storage device, or other devices through the output unit 140 at any time.

Figure 3:
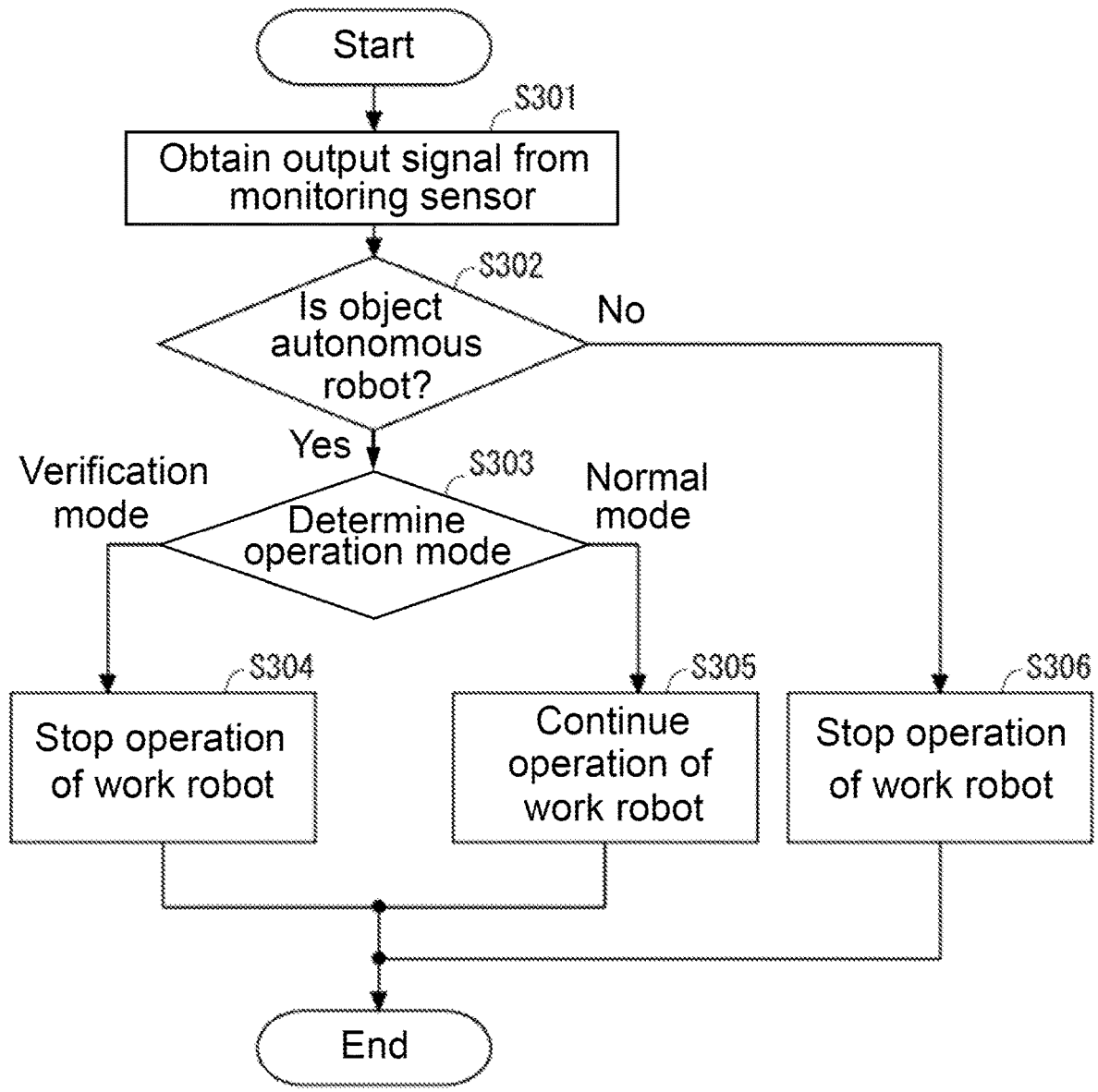
FIG. 3 is a flowchart of an example procedure performed by a safety controller according to the embodiment.

FIG. 3 is a flowchart of an example procedure performed by the safety controller 103. The safety controller 103 starts the procedure in FIG. 3 after the power is turned on, for example. Before the procedure below is started, the robot controller 104 presets the operation mode (operation verification mode or normal operation mode) of the robot 101 based on an indication by the user of the safety system 100 performed through, for example, an operation on a switch (not shown).

In step S301, the monitoring sensor 102 detects an object entering the monitoring area 106. The input unit 110 obtains an output signal from the monitoring sensor 102 detecting the object entering the monitoring area 106.

Subsequently, in step S302, the determiner 121 determines, based on the output signal from the monitoring sensor 102 obtained in step S301, whether the object in the monitoring area 106 is the autonomous robot 300, using the identification information stored in the storage 130. In response to the determiner 121 determining that the object in the monitoring area 106 is the autonomous robot 300, the controller 120 advances the processing to step S303. In response to the determiner 121 determining that the object in the monitoring area 106 is not the autonomous robot 300, the controller 120 advances the processing to step S306.

In step S303, the determiner 121 determines whether the work robot 101 is in the operation verification mode or in the normal operation mode. In response to the determiner 121 determining that the work robot 101 is in the operation verification mode, the controller 120 advances the processing to step S304. In response to the determiner 121 determining that the work robot 101 is in the normal operation mode, the controller 120 advances the processing to step S305.

In step S304, the data generator 122 generates a control signal to stop the operation of the work robot 101 and transmits the generated control signal to the robot controller 104 through the output unit 140. The robot controller 104 controls the work robot 101 to stop operating in response to the received control signal. In this manner, in the operation verification performed before the work robot 101 is in operation, the work robot 101 is determined to stop operating appropriately in response to the autonomous robot 300 entering the monitoring area 106 by using the autonomous robot 300 as an object that is likely to come in contact with the work robot 101.

In step S305, the data generator 122 generates a control signal to allow the work robot 101 to continue operating and transmits the generated control signal to the robot controller 104 through the output unit 140. The robot controller 104 controls the work robot 101 to continue the operation in response to the received control signal. This allows the work robot 101 in operation to continue the operation while the autonomous robot 300 is traveling in the monitoring area 106 along the predetermined route avoiding contact with the work robot 101. Thus, unlike in the operation verification mode in step S304, the work robot 101 does not stop operating.

In step S306, the data generator 122 generates a control signal to stop the operation of the work robot 101 and transmits the generated control signal to the robot controller 104 through the output unit 140. The robot controller 104 controls the work robot 101 to stop operating in response to the received control signal. With the object detected by the monitoring sensor 102 being an object other than the autonomous robot 300, the object is likely to come in contact with the work robot 101. The operation of the work robot 101 is thus stopped. In response to the processing in step S304, S305, or S306 being performed, the controller 120 ends the procedure of the flowchart.

Thus, the structure in the present embodiment allows the verification as to whether the work robot 101 can stop operating in response to the autonomous robot 300 entering the monitoring area 106, by using the autonomous robot 300 used with the work robot 101 in operation as an object that is likely to come in contact with the work robot 101 in the monitoring area 106. This allows the operation verification of the work robot 101 without any time and cost for using a person such as a worker or other objects.

Others

The embodiment described above is a mere example of the present invention. The present invention is not limited to the embodiment described above, but may be modified variously within the scope of the technical ideas of the invention. Modifications of the above embodiment will be described below. In the modifications described below, like reference numerals denote like structural elements in the above embodiment. Such elements will not be described. The structural elements and the processing of the above embodiment and the modifications below may be combined with each other as appropriate.

First Modification

In a first modification, the safety controller 103 in the above procedure controls the work robot 101 in the operation verification mode to stop operating or continue operating in response to the autonomous robot 300 entering the monitoring area 106. In this modification, the user of the safety system 100 specifies an operation to be verified from the stopping operation and the continuing operation. The information specifying the operation verification is stored in the storage 130.

Figure 4:
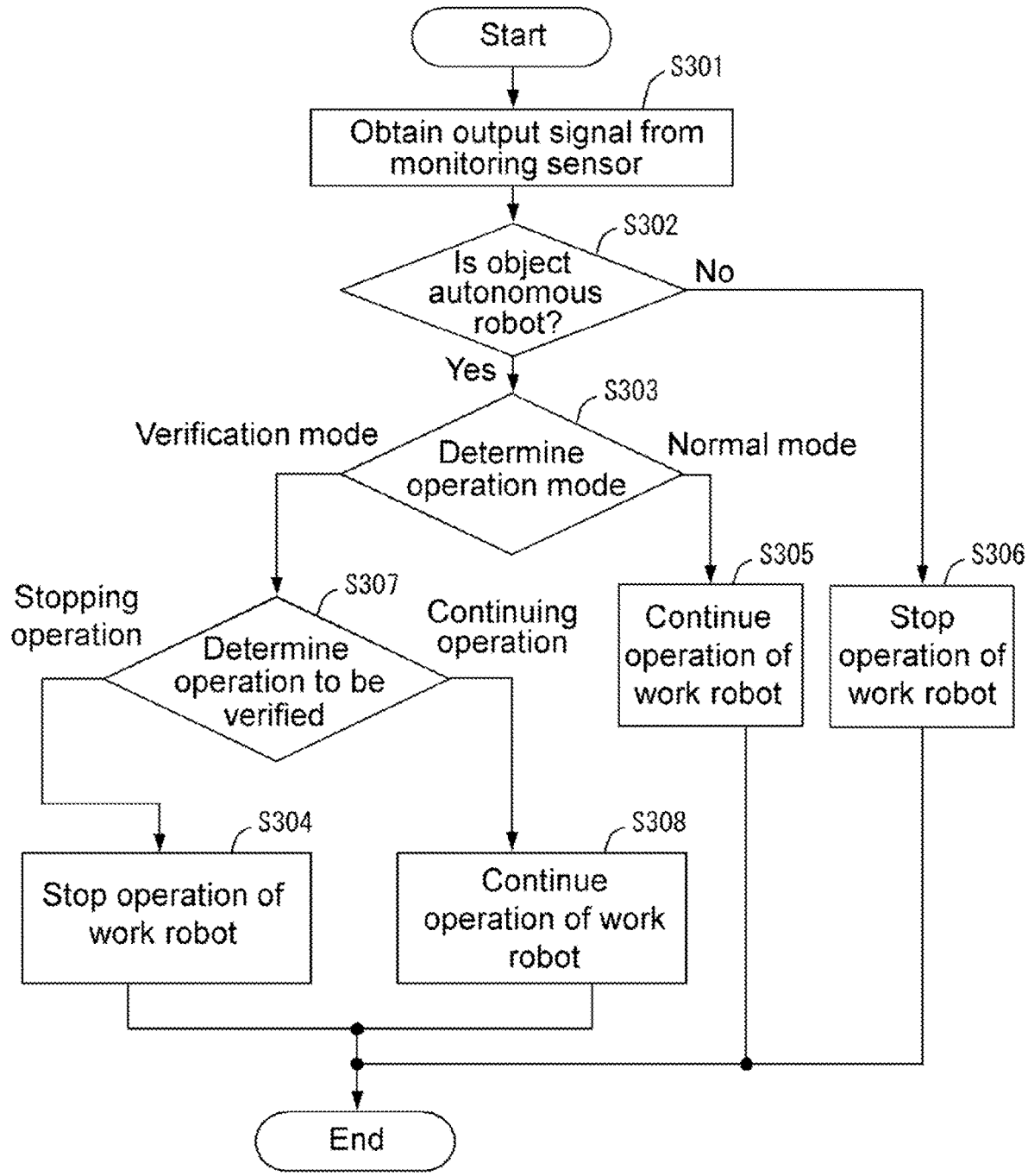
FIG. 4 is a flowchart of an example procedure performed by a safety controller in a first modification.

FIG. 4 is a flowchart of an example procedure performed by the safety controller 103 in the present modification. The procedure will be described focusing on its differences from the procedure in FIG. 3.

In step S303, in response to the determiner 121 determining that the operation mode of the work robot 101 is the operation verification mode, the controller 120 advances the processing to step S307. In step S307, the determiner 121 determines the operation verification of the work robot 101 based on the information specifying the operation verification provided by the user and stored in the storage 130. In this modification, example operations to be verified are the stopping operation and the continuing operation of the work robot 101. In response to the determiner 121 determining that the operation to be verified is the stopping operation of the work robot 101, the controller 120 advances the processing to step S304. In response to the determiner 121 determining that the operation to be verified is the continuing operation of the work robot 101, the controller 120 advances the processing to step S308.

In step S304, the data generator 122 generates a control signal to stop the operation of the work robot 101 and transmits the generated control signal to the robot controller 104 through the output unit 140. The robot controller 104 controls the work robot 101 to stop operating in response to the received control signal. In step S308, the data generator 122 generates a control signal to allow the work robot 101 to continue the operation and transmits the generated control signal to the robot controller 104 through the output unit 140. The robot controller 104 controls the work robot 101 to continue its operation in response to the received control signal.

As described above, in the operation verification mode for the work robot 101 in the present modification, the autonomous robot 300 entering the monitoring area 106 may be determined as an object that is likely to come in contact with the work robot 101 to verify that the operation of the work robot 101 can be stopped, and may also be determined as an object that is unlikely to come in contact with the work robot 101 to verify that the operation of the work robot 101 can be continued. In response to the processing in step S304, S305, or S306 being performed, the controller 120 ends the procedure of the flowchart.

In the present modification, the verification is performed as to whether the operation of the work robot 101 can be continued, in addition to the verification as to whether the operation of the work robot 101 can be stopped. This allows more appropriate operation verification of the work robot 101 in operation.

Second Modification

In a second modification, the safety controller 103 in the above procedure may divide the monitoring area 106 into multiple subareas, specify a subarea to undergo operation verification of the work robot 101 from the multiple subareas, and verify the operation of the work robot 101 for each subarea.

Figure 5:
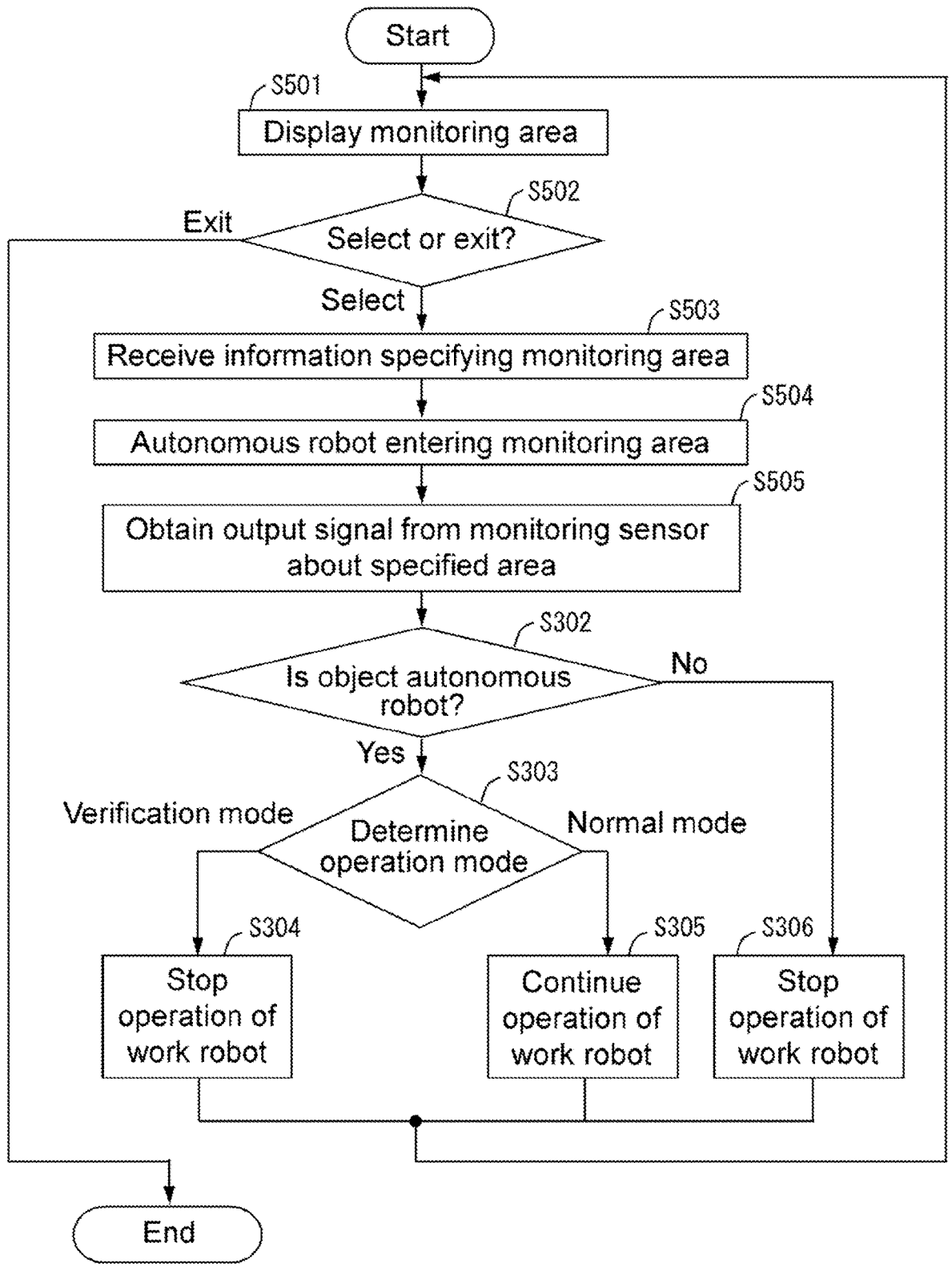
FIG. 5 is a flowchart of an example procedure performed by a safety controller in a second modification.

FIG. 5 is a flowchart of an example procedure performed by the safety controller 103 in the present modification. The procedure will be described focusing on its differences from the procedure in FIG. 3.

Figure 6:
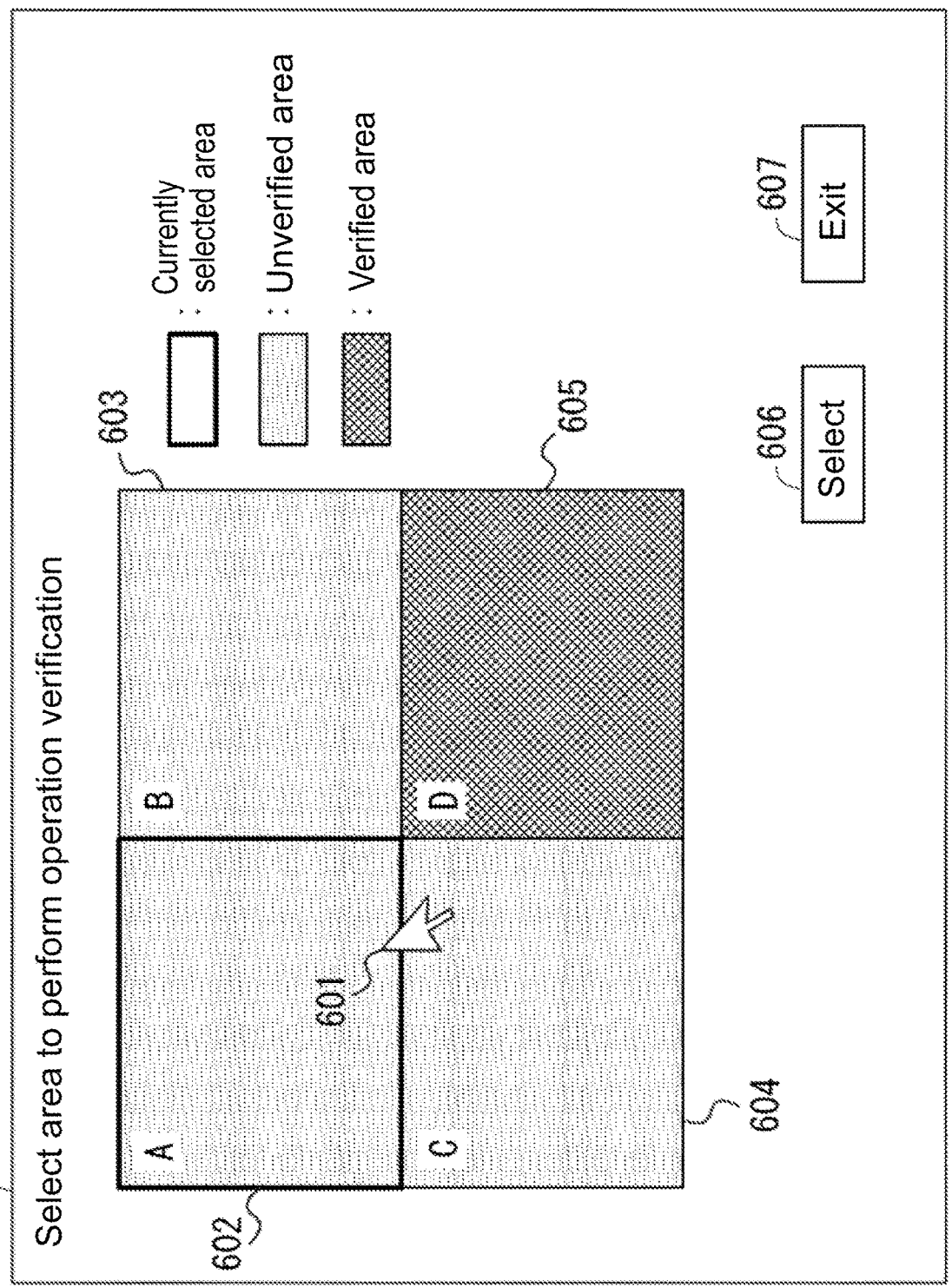
FIG. 6 is a schematic diagram of an example display screen in the second modification.

In step S501, the data generator 122 in the controller 120 generates a screen for specifying a subarea to undergo operation verification of the work robot 101 from the subareas of the monitoring area 106. The data for the generated screen is transmitted to the PC 105, and the screen appears on the display of the PC 105. FIG. 6 schematically shows an example screen appearing on the PC 105 for specifying an area to undergo operation verification of the work robot 101. In this modification, the monitoring area 106 is divided into four areas A to D in a top view of the floor on which the work robot 101 is installed. The areas A to D each correspond to a subarea of the monitoring area in an aspect of the present invention. The monitoring area 106 may be divided in a manner other than in the example shown in the figure. For example, the monitoring area 106 may be divided into three-dimensional areas. The areas may be displayed differently as appropriate in accordance with the manner of dividing the monitoring area 106.

A screen 610 appearing on the PC 105 for specifying the area to undergo operation verification displays a pointer 601 for the user of the safety system 100 to specify an area, an area A 602, an area B 603, an area C 604, and an area D 605. The screen 610 also displays a select button 606 to perform the operation verification in the selected area and an exit button 607 to exit the operation verification. The screen 610 also displays whether the operation of the work robot 101 has been verified for each area and displays the area currently selected as the area to undergo operation verification. In the illustrated example, the operation of the work robot 101 has yet to be verified for the area A 602, the area B 603, and the area C 604 and has been verified for the area D 605. The figure shows the screen on which the user of the safety system 100 has selected the area A 602 as the area to undergo operation verification of the work robot 101.

Subsequently, in step S502, the user of the safety system 100 operates the PC 105 to specify the area to undergo the operation verification of the work robot 101 and press the select button or press the exit button to exit the operation verification of the work robot 101. A signal indicating that the area specified by the user or the user pressing the select or exit button is transmitted to the safety controller 103 from the PC 105. In response to the select button being pressed, the controller 120 advances the processing to step S503. In response to the exit button being pressed, the controller 120 exits the procedure of the flowchart.

Subsequently, in step S503, the controller 120 receives information specifying the monitoring area to undergo the operation verification of the work robot 101 performed by the user of the safety system 100 in step S502. The controller 120 in step S503 corresponds to a receiver configured to receive information specifying at least one of the plurality of areas as a monitoring area. The controller 120 then advances the processing to step S504.

In step S504, the controller 120 transmits, to the autonomous robot 300, a control signal to move to the specified monitoring area received in step S503 through the output unit 140 and a network (not shown). The autonomous robot 300 moves into the specified monitoring area based on the control signal. The autonomous robot 300 may be moved into the monitoring area in a manner other than described above. The controller 120 then advances the processing to step S505.

In step S505, the monitoring sensor 102 monitors the area specified in step S502. The input unit 110 in the safety controller 103 obtains the output signal from the monitoring sensor 102 detecting an object in the area. After the processing in step S505 is performed, the controller 120 performs the processing in steps S302 to S306 based on the output signal from the monitoring sensor 102 obtained in step S505. In response to the processing in step S304, step S305, or step S306 being performed, the controller 120 returns to step S501 and repeats the above process. When the processing in step S501 is performed again, the screen 610 displays the updated status about the operation verification for each of areas A to D. The controller 120 may store, into the storage 123, information indicating whether the operation of the work robot 101 is unverified or verified in each area.

In the present modification, the user of the safety system 100 can verify the operation of the work robot 101 in each area divided from the monitoring area 106 monitored by the monitoring sensor 102. This allows the user to perform more detailed operation verification of the work robot 101 while varying the conditions in each area in the operation verification, such as varying the manner of the autonomous robot 300 entering the area and the operation of the work robot 101. The user of the safety system 100 can specify the area to undergo operation verification alone among the subareas A to D of the monitoring area 106, thus allowing more efficient operation verification of the work robot 101.

APPENDIX 1

A robot control system (100), comprising:
a monitored robot (101) for which a monitoring area is defined; and
a robot controller (120) configured to control the monitored robot in a plurality of modes including a first mode to change an operation of the monitored robot in response to an object detected in the monitoring area being a robot (300).

APPENDIX 2

An information processor (103), comprising:
an obtainer (110) configured to obtain an output signal indicating detection of an object in a monitoring area defined for a monitored robot; and
a robot controller (120) configured to control the monitored robot in a plurality of modes including a first mode to change an operation of the monitored robot in response to the object being a robot (300) based on the output signal obtained by the obtainer.

APPENDIX 3

An information processing method, comprising:
(S301) obtaining an output signal indicating detection of an object in a monitoring area defined for a monitored robot; and
(S304, S305) controlling the monitored robot in a plurality of modes including a first mode to change an operation of the monitored robot in response to the object being a robot based on the obtained output signal.

REFERENCE SIGNS LIST 100 safety system
101 work robot
102 monitoring sensor
120 controller
300 autonomous robot

What is claimed is:

1. A robot control system, comprising:
a monitored robot for which a monitoring area is defined; and
a robot controller configured to control the monitored robot in a plurality of modes including a first mode to change or continue an operation of the monitored robot and a second mode to continue the operation of the monitored robot,
wherein the robot controller controls the monitored robot to stop the operation of the monitored robot in response to an object detected in the monitoring area being an autonomous robot and an operation mode of the monitored robot being the first mode,
the robot controller controls the monitored robot to continue the operation of the monitored robot in response to the object detected in the monitoring area being the autonomous robot and the operation mode of the monitored robot being the second mode, and
the robot controller controls the monitored robot to stop the operation of the monitored robot in response to the object detected in the monitoring area being not the autonomous robot.

2. The robot control system according to claim 1, further comprising:
a determination controller configured to determine whether to change or continue the operation of the monitored robot in accordance with specified information specifying operation verification of the monitored robot,
wherein in the first mode, the robot controller controls the monitored robot to change or continue the operation in accordance with a result of determination performed by the determination controller.

3. The robot control system according to claim 1, wherein the monitoring area includes a plurality of subareas, and the robot control system further includes a receiving controller configured to receive information specifying at least one subarea of the plurality of subareas to undergo operation verification in the first mode.

4. The robot control system according to claim 3, wherein the robot controller controls the robot to enter the at least one subarea specified with the information received by the receiving controller.

5. The robot control system according to claim 1, further comprising:

a display configured to display information indicating whether the monitoring area is an area that has undergone operation verification of the monitored robot in the first mode.

6. An information processor, comprising:
an obtaining controller configured to obtain an output signal indicating detection of an object in a monitoring area defined for a monitored robot; and
a robot controller configured to control the monitored robot in a plurality of modes including a first mode to change or continue an operation of the monitored robot and a second mode to continue the operation of the monitored robot,
wherein the robot controller controls the monitored robot to stop the operation of the monitored robot in response to an object detected in the monitoring area being an autonomous robot and an operation mode of the monitored robot being the first mode,
the robot controller controls the monitored robot to continue the operation of the monitored robot in response to the object detected in the monitoring area being the autonomous robot and the operation mode of the monitored robot being the second mode, and
the robot controller controls the monitored robot to stop the operation of the monitored robot in response to the object detected in the monitoring area being not the autonomous robot.

7. An information processing method, comprising:
obtaining an output signal indicating detection of an object in a monitoring area defined for a monitored robot;
controlling the monitored robot in a plurality of modes including a first mode to change or continue an operation of the monitored robot and a second mode to continue the operation of the monitored robot; and
controlling the monitored robot to stop the operation of the monitored robot in response to an object detected in the monitoring area being an autonomous robot and an operation mode of the monitored robot being the first mode,
controlling the monitored robot to continue the operation of the monitored robot in response to the object detected in the monitoring area being the autonomous robot and the operation mode of the monitored robot being the second mode, and
controlling the monitored robot to stop the operation of the monitored robot in response to the object detected in the monitoring area being not the autonomous robot.

8. A non-transitory computer readable medium storing a program for causing a computer to execute a process, comprising:
obtaining an output signal indicating detection of an object in a monitoring area defined for a monitored robot;
controlling the monitored robot in a plurality of modes including a first mode to change or continue an operation of the monitored robot and a second mode to continue the operation of the monitored robot; and
controlling the monitored robot to stop the operation of the monitored robot in response to an object detected in the monitoring area being an autonomous robot and an operation mode of the monitored robot being the first mode,
controlling the monitored robot to continue the operation of the monitored robot in response to the object detected in the monitoring area being the autonomous robot and the operation mode of the monitored robot being the second mode, and
controlling the monitored robot to stop the operation of the monitored robot in response to the object detected in the monitoring area being not the autonomous robot.

9. The robot control system according to claim 1, further comprising a safety controller configured to determine whether the object detected in the monitoring area is the autonomous robot and determine, in response to determining that the object detected in the monitoring area is the autonomous robot, whether the operation mode of the monitored robot is the first mode or the second mode.

10. The robot control system according to claim 9, wherein the safety controller is further configured to stop the operation of the monitored robot, without determining whether the operation mode of the monitored robot is the first mode or the second mode, in response to determining that the object detected in the monitoring area is not the autonomous robot.

* * * * *